(12) United States Patent
Liu et al.

(10) Patent No.: US 7,050,123 B2
(45) Date of Patent: May 23, 2006

(54) ASSEMBLED HOUSING OF A REAR PROJECTION TELEVISION

(75) Inventors: Chia-Yu Liu, Taoyuan (TW);
Chang-Chien Li, Shinjuang (TW);
Chih-Kang Peng, Taoyuan (TW);
Wen-Chung Ho, Taoyuan (TW);
Chi-Hong Chen, Taoyuan (TW)

(73) Assignee: Benq Corporation, Taoyuan (TW)

( * ) Notice: Subject to any disclaimer, the term of this patent is extended or adjusted under 35 U.S.C. 154(b) by 542 days.

(21) Appl. No.: 10/310,891

(22) Filed: Dec. 6, 2002

(65) Prior Publication Data

US 2003/0117533 A1 Jun. 26, 2003

(30) Foreign Application Priority Data

Dec. 7, 2001 (TW) .............................. 90130458 A (51) Int. Cl.
*H04N 5/64* (2006.01)
(52) U.S. Cl. ........................ 348/787; 348/789; 359/460
(58) Field of Classification Search ................ 348/787, 348/788, 744, 789, 836; 359/460; 353/79, 353/119; 312/7.2
See application file for complete search history.

(56) References Cited

U.S. PATENT DOCUMENTS

| 4,400,723 | A | * | 8/1983 | Fanizza et al. | .............. 348/788 |
| 4,647,166 | A | * | 3/1987 | Franken et al. | ................ 353/79 |
| 5,343,262 | A | * | 8/1994 | Park | ........................... 353/119 |
| 5,491,585 | A | * | 2/1996 | Dolgoff | ....................... 359/449 |
| 5,796,443 | A | | 8/1998 | Kawajiri et al. | |
| 6,466,369 | B1 | * | 10/2002 | Maddock | ..................... 359/460 |

FOREIGN PATENT DOCUMENTS

| CN | 1115954 A | 1/1996 |
| TW | 423293 | 2/2001 |

* cited by examiner

*Primary Examiner*—Victor R. Kostak
(74) *Attorney, Agent, or Firm*—Rabin & Berdo, PC (57) ABSTRACT

An assembled housing of rear projection television comprising a foldable main framework and a foldable back cover is disclosed. The main framework is a flat structure as folded, while the main framework forms a ring structure as unfolded. The ring structure includes a front opening and a back opening, while the back cover is positioned in the back opening to form a chamber. The foldable design of the housing facilitates the users and the vendors to assemble the rear projection television, and also reduce the hardware space occupied by the housing, so as to reduce the cost of transportation compared to a traditional rear projection television.

18 Claims, 6 Drawing Sheets

ASSEMBLED HOUSING OF A REAR PROJECTION TELEVISION

This application incorporates by reference of Taiwan application Serial No. 90130458, filed Dec. 7, 2001.

BACKGROUND OF THE INVENTION

1. Field of the Invention

The invention relates in general to a housing of the rear projection television, and more particularly to an assembled housing of the rear projection television.

2. Description of the Related Art

A television is becoming an essential demand for our daily life nowadays. Especially, the invention of a rear projection television, which enlarges the images, provides a fresh and new experience of the entertainment more advanced than a conventional TV. A brief description and the accompanying drawings with respect to the constructions of the rear projection television are as follows.

Figure 1:
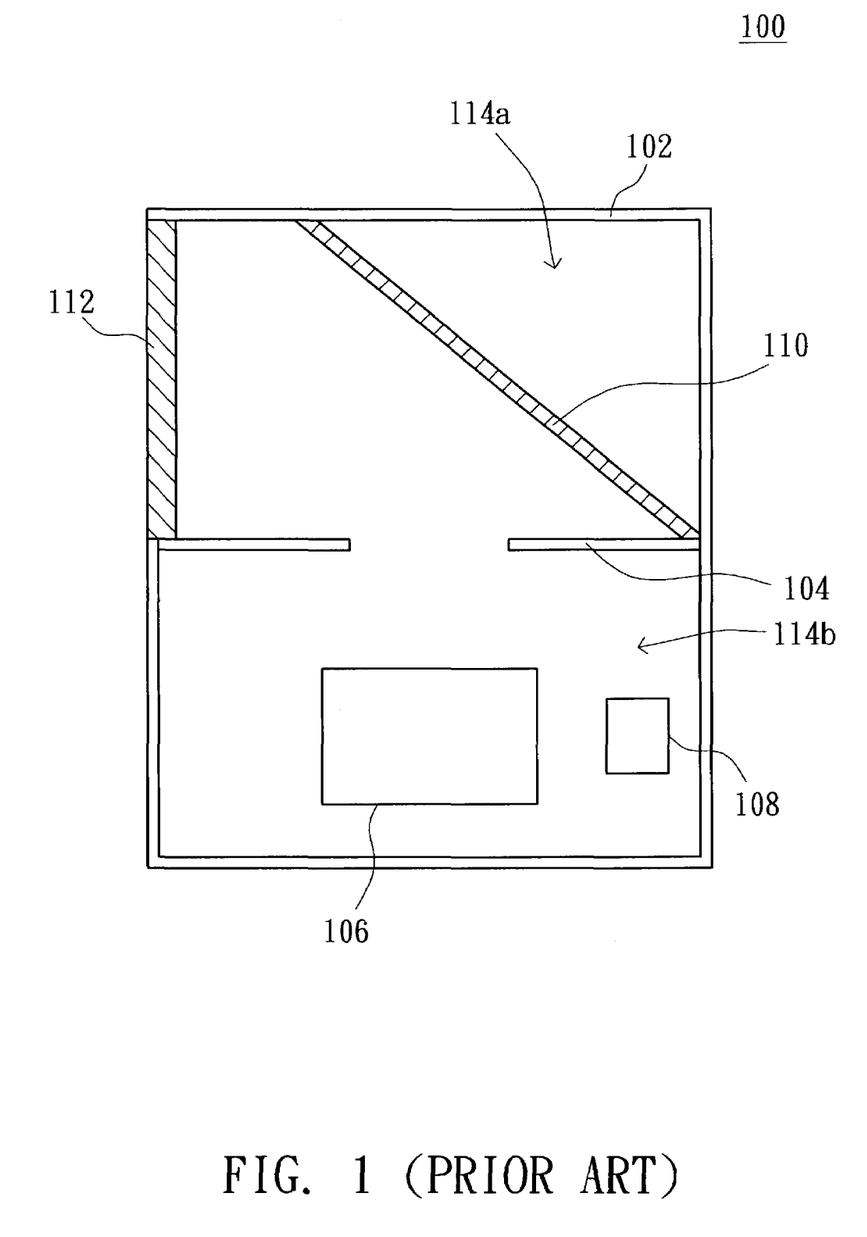
FIG. 1(Prior Art) shows a perspective view of the general rear projection television.

Referring to FIG. 1, a perspective view of a rear projection television is shown. The rear projection television 100 comprises at least a fixed housing 102, the partition 104, an optical module 106, a lamp module 108, a reflector 110 and a screen 112. The partition 104, the optical module 106, the lamp module 108 and the reflector 110 are located inside the fixed housing 102, while the screen 112 is located in an edged opening of the fixed housing 102 to produce the images. The partition 104 separates the chamber to form an upper chamber 114a and a lower chamber 114b of the fixed housing 102. The reflector 110 leans against the upper chamber 104a with two ends of the reflector 110 coupled to border walls of the fixed housing 102, while the optical module 106 and the lamp module 108 are located in the lower chamber 114b. In addition, the optical module 106 can project the rays of light generated by the lamp module 108 through the gateway on the partition 104 onto the reflector 110 in the upper chamber 114a. And thus, the rays strike the screen 112 to produce the images by the reflection of the reflector 110.

The size of the rear projection television 100 is larger than a normal television due to the extent of the projection distance. In other words, the fixed housing 102 occupies a large space. Therefore, it is rather inconvenient and costly for the vendors and users to transport the rear projection television 100. Additionally, the optical module 106 is composed of the dangerous voltage and the high frequency components, and also the fixed housing 102 is designed as invariable, so that the risk assessment and the electromagnetic interference (EMI) assessment must include the whole components of the rear projection television 100. Hence it increases the complexity of the product assessment and raises the difficulty of passing the test. Consequently, it is quite inappropriate for the vendors and users to Do It Yourself (DIY), and also very tough to replace or maintain some components.

SUMMARY OF THE INVENTION

It is therefore an object of the invention to provide an assembled housing of the rear projection television. The foldable design of the housing provides the vendors and users to assemble the rear projection television, so as to reduce the hardware space occupied by the housing and also reduce the cost in the transportation of the rear projection television.

Accordingly, the object of the present invention is to provide an assembled housing of the rear projection television, comprising at least a foldable main framework and a foldable back cover, wherein the main framework is a flat structure as folded, while the main framework forms a ring structure as unfolded. The ring structure includes a front opening and a back opening, wherein the back cover is positioned in the back opening to form a chamber.

Accordingly, the object of the present invention also provides the other rear projection television, comprising at least a foldable main framework, a foldable back cover, a partition, a lamp module, an optical module, a reflector and a screen. The structure of the main framework is flat as folded, while the structure of the main framework is round as unfolded. And also the ring structure includes a front opening and a back opening, wherein the back cover is located in the back opening to form a chamber. In addition, the partition can be located inside the main framework and then separates the main framework as an upper chamber and a lower chamber, so as to separate the front opening as an upper opening and a lower opening. The partition includes a gateway, which is a channel for the upper chamber and the lower chamber. The front cover is connected with the front opening of the lower chamber, the lamp module and the optical module are positioned inside the lower chamber, the reflector is positioned in the upper chamber, and the screen is positioned in the opening of the upper chamber. The lamp module provides rays of light through the gateway, and then the reflector reflects images onto the screen.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention is to provide an assembled housing of the rear projection television, comprising at least a foldable main framework and a foldable back cover. The unfolded main framework includes a front opening and a back opening, and the unfolded back cover can be coupled to the back opening of the main framework, so that the main framework is connected with the back cover to round a chamber. It is very convenient to install a speaker, an optical module, a lamp module, a screen, a reflector and a control module inside the housing of the rear projection television. The construction and operation method of the invention, however, together with additional objects and advantages thereof will be best understood from the following description of specific embodiments when read in connection with the accompanying drawings.

Figure 2:
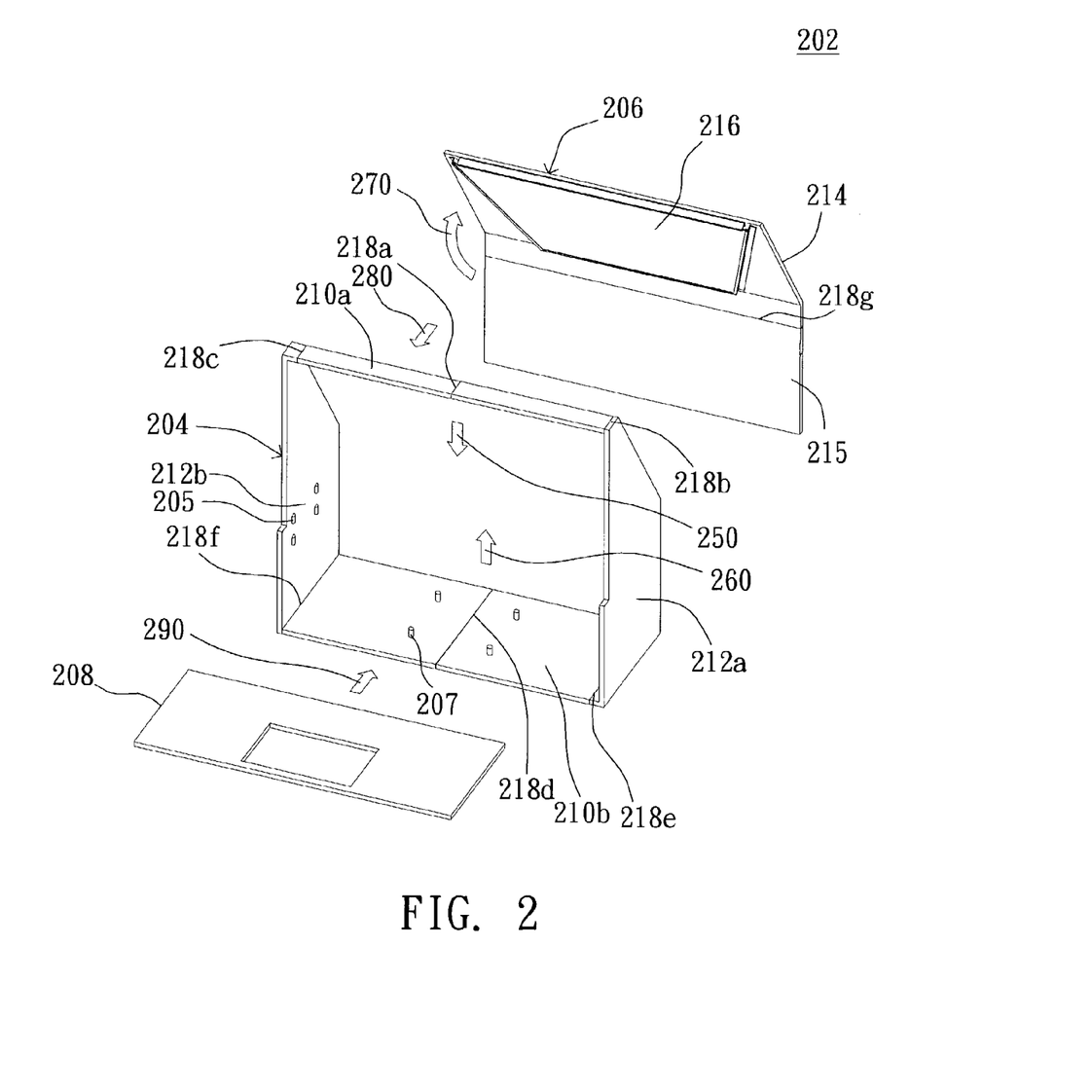
FIG. 2 shows a decomposition drawing of the assembled housing of the rear projection television according to the preferred embodiment invention.

Referring to FIG. 2, a decomposition drawing of the assembled housing of the rear projection television is shown. The assembled housing of the rear projection television includes a housing 202, which comprises at least a foldable main framework 204, a foldable back cover 206 and a partition 208. The main framework 204 includes foldable boards 210a and 210b, flat boards 212a and 212b, and the back cover 206 includes a backboard 215, a foldable cover board 214 and a mirror-framed board 216. The mirror-framed board 216 is coupled with the top of the foldable cover board 214. Therein the top of the sidewalls of the main framework 204 is an incline, wherein the foldable cover board 214 is connected to the incline so that a reflector can be set to the mirror-framed board 216 positioned inside the foldable cover board 214.

The foldable board 210a includes a hinge 218a, which enables the foldable board 210a to fold. The hinges 218b and 218c of the foldable board 210a contact with the top of the flat boards 212a and 212b, respectively, while the foldable board 210b includes a hinge 218d, and the hinges 218e and 218f of the foldable board 210b contact with the bottom of the flat boards 212a and 212b, respectively.

Figure 3A:
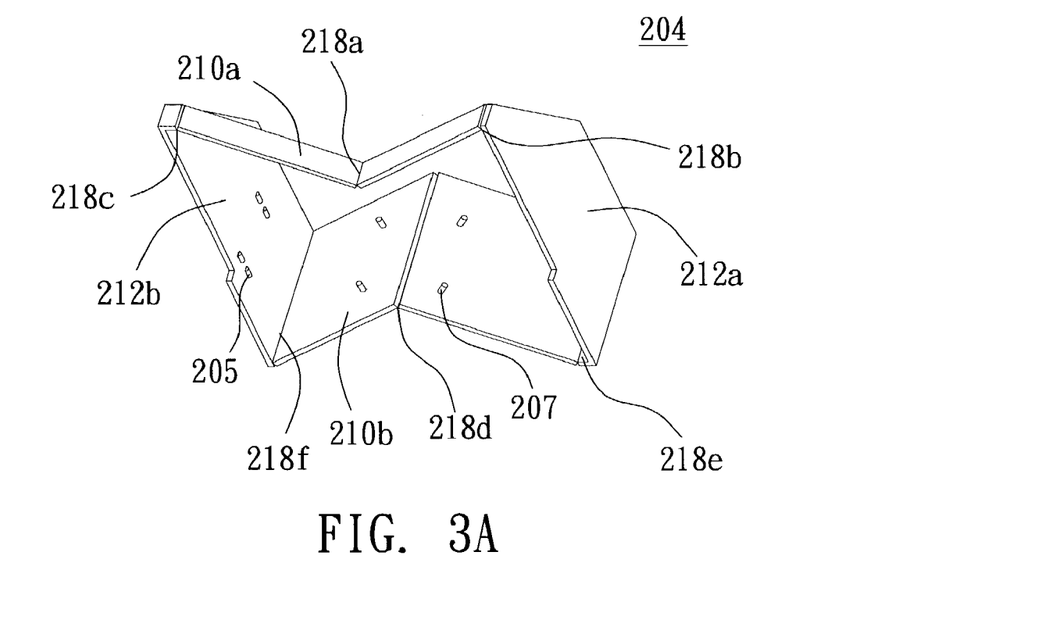
FIG. 3A shows a perspective view of the folding main framework in FIG. 2.
Figure 3B:
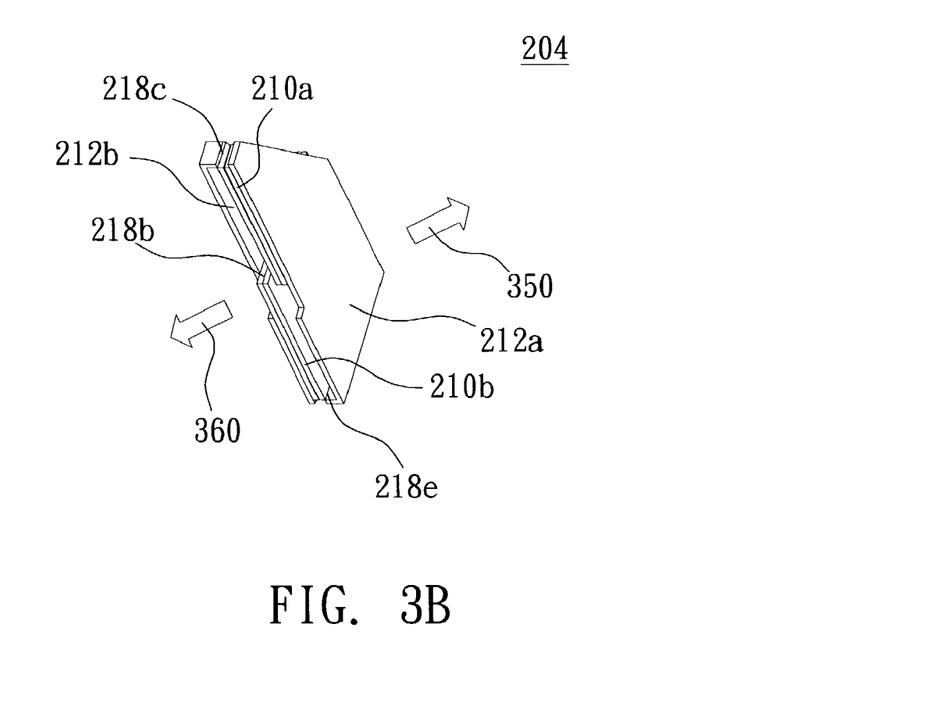
FIG. 3B shows a perspective view of the folded main framework in FIG. 2.

The main framework 204 in FIG. 2 is unfolded and forms a ring structure. Referring to FIG. 3A, when a user wants to fold the main framework 204, the user only needs to impose a force on the foldable boards 210a and 210b, that is the top and the bottom of the ring structure, such that the hinges 218a, 218b, 218c, 218d, 218e and 218f make the foldable boards 210a and 210b fold along the directions of the arrows 250 and 260 in FIG. 2. Subsequently, when the foldable boards 210a and 210b continue to fold, the left and the right halves of the foldable board 210a overlap, as well as the foldable board 210b, and also the foldable boards 210a and 210b overlap in a manner of cross, so as to reduce the distance between the flat boards 212a and 212b. It means to reduce the distance between both opposite walls of the ring structure, so that the main framework 204 becomes a folded status and forms a flat structure, as shown in FIG. 3B. And thus, the hardware space occupied by the main framework 204 in FIG. 3B is exactly rather smaller than the main framework 204 in FIG. 2. Referring to FIG. 3B, as the user imposes a force on the flat boards 212a and 212b can the flat boards 212a and 212b move along the directions of the arrows 350 and 360 respectively so that the main framework 204 recovers to the unfolded status as shown in FIG. 2.

What particular is that the foldable boards 210a and 210b need to be designed to overlap in a manner of cross as the length of the foldable boards 210a and 210b is greater than that of the flat boards 212a and 212b. Thus, the main framework 204 can reach the folded status.

Figure 4A:
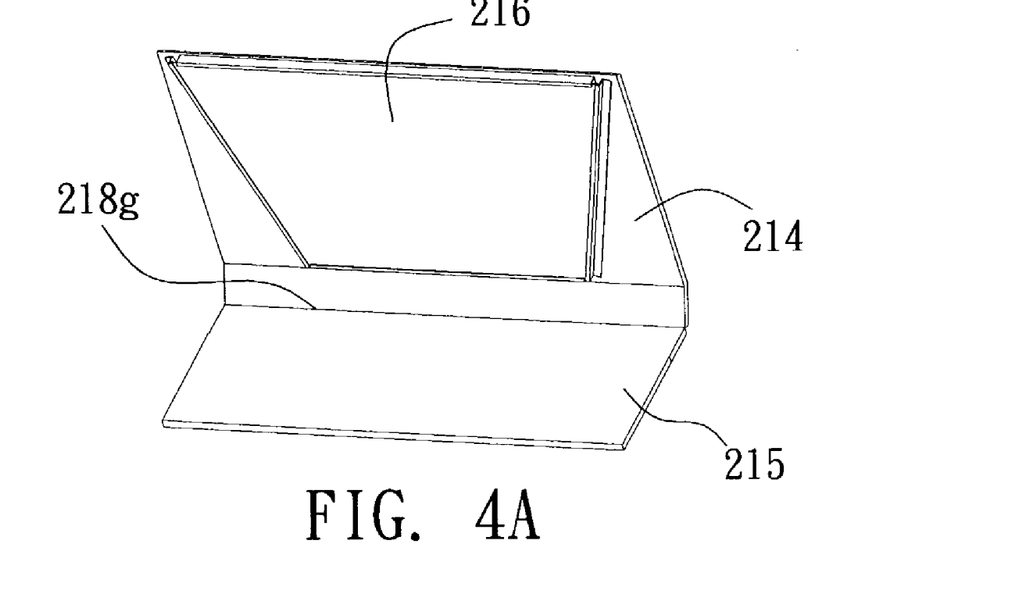
FIG. 4A shows a perspective view of the folding back cover in FIG. 2.
Figure 4B:
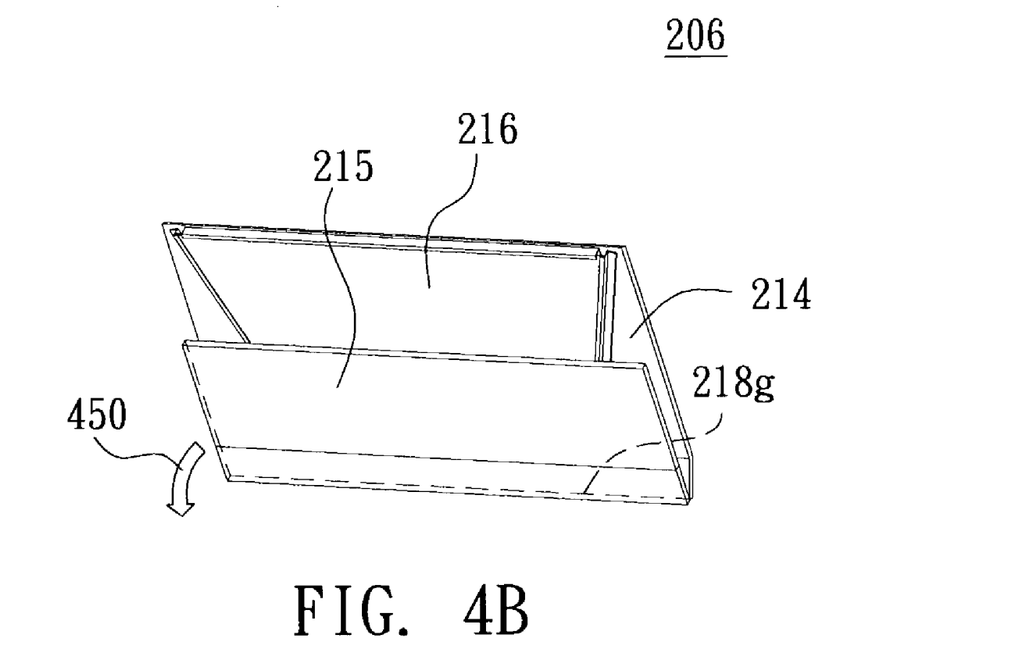
FIG. 4B shows a perspective view of the folded back cover in FIG. 2.

The foldable cover board 214 of the back cover 206 in FIG. 2 includes a hinge 218g, which enables the foldable cover board 214 to fold. When a user wants to fold an unfolded back cover 206, the user only needs to impose a force on the foldable cover board 214, so that the foldable cover board 214 folds along the direction of the arrow 270 in FIG. 2, as shown in FIG. 4A. Accordingly, as the foldable cover board 214 continues to fold, the bottom of the foldable cover board 214 contacts the end of the mirror-framed board 216, as shown in FIG. 4B. Therefore, the hardware space of the back cover 206 in FIG. 4B is rather smaller than that in FIG. 2. Referring to FIG. 4B, as the user imposes a force on the foldable back cover 206, the foldable cover board 214 fold along the direction of the arrow 450, and thus the back cover 206 returns to the unfolded status shown as FIG. 2

Figure 5:
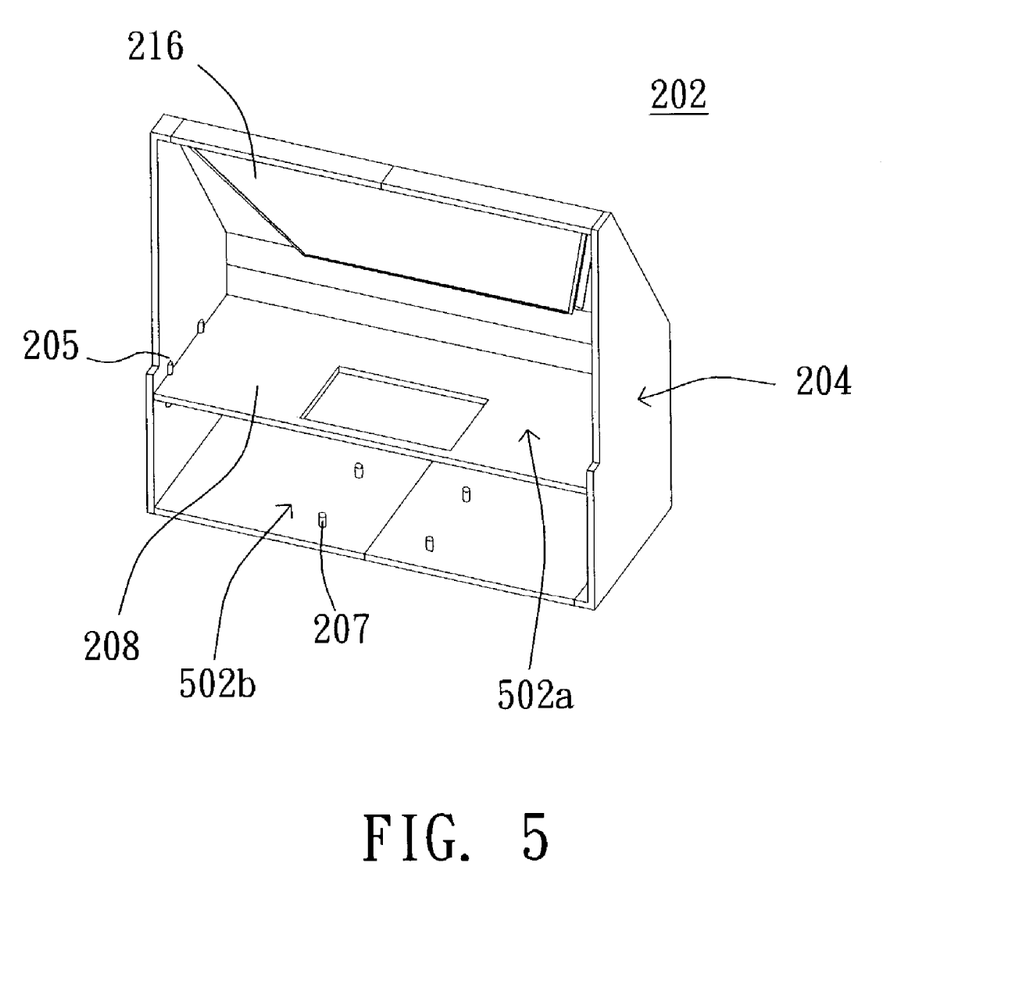
FIG. 5 shows a composition drawing of the assembled housing of the rear projection television according to the preferred embodiment invention.

Furthermore, referring to FIG. 2, the back cover 206 is connected to the back opening of the main framework 204 along the direction of the arrow 280, and the partition 208 is connected to the main framework 204 along the direction of the arrow 290, as shown in FIG. 5. Referring to FIG. 5, it shows the composition drawing of the preferred embodiment of the invention.

Figure 6:
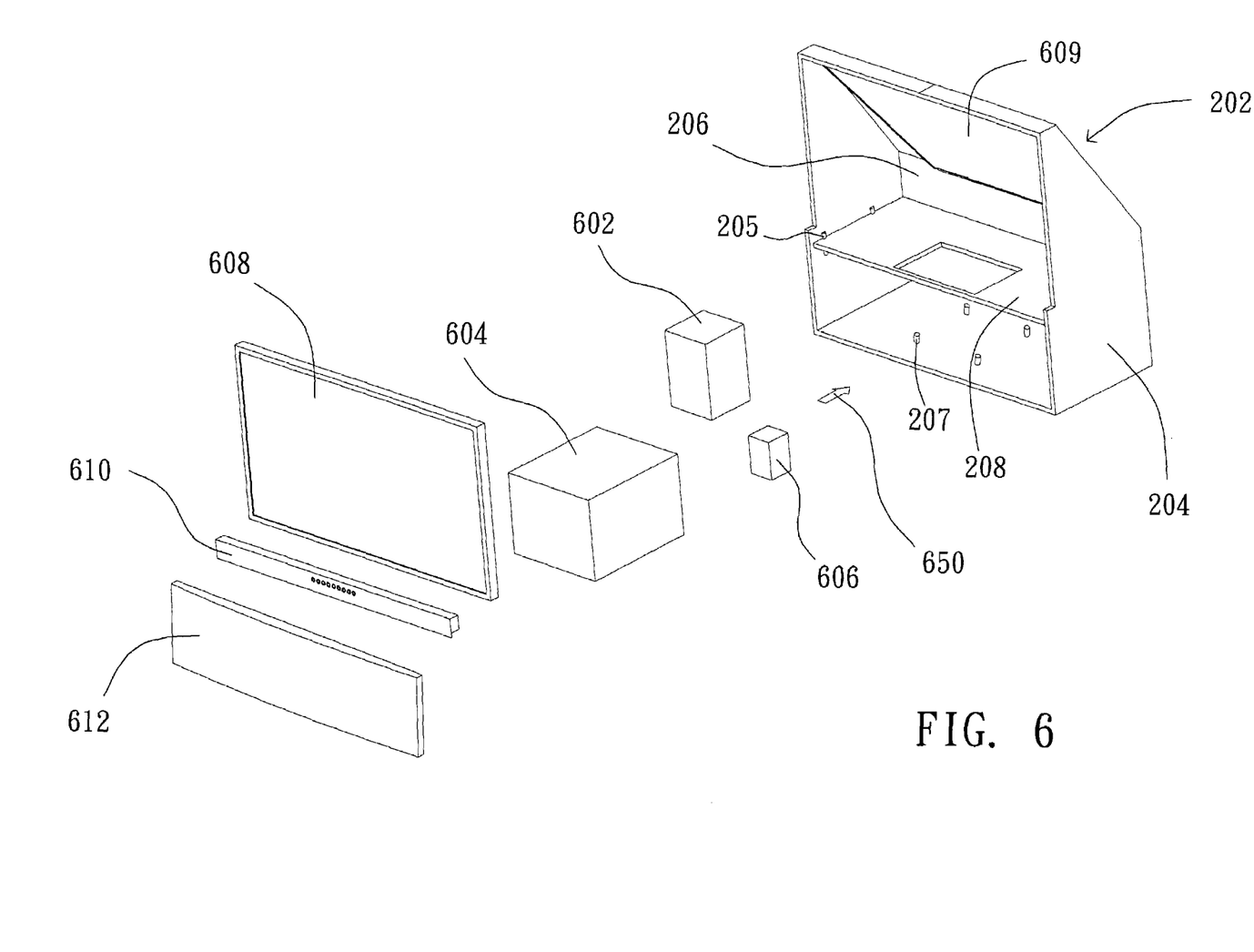
FIG. 6 shows a decomposition drawing of the assembled components of the housing of the rear projection television in FIG. 5.

Accordingly, referring to FIG. 5, the main framework 204 and the back cover 206 round a chamber, while the partition 208 separates the chamber to form an upper chamber 502a and a lower chamber 502b, so that the mirror-framed board 216 of the back cover 206 is positioned in the upper chamber 502a. Further more, a speaker 602, an optical module 604 and a lamp module 606 can be assembled in the lower chamber 502b, and a screen 608 and a reflector 609 can be respectively assembled in the opening of the upper chamber 502a and at the mirror-framed board 216. Besides, a control module 610 and a front cover 612 can be assembled in the opening of the lower chamber 502b by clasping, as shown in FIG. 6. As a result, a rear projection television composed of the speaker 602, the optical module 604, the lamp module 606, the screen 608, the control module 610 and the front cover 612 set inside the housing 202 is formed by assembling along the direction of the arrow 650. As for the risk assessment and the EMI assessment, since the dangerous voltage and high frequency elements are located inside the optical module 604, it only needs the optical module 604 to meet the requirements of the risk and EMI assessment. In addition, the sidewalls of the main framework 204 include the partition positioning point 205 for the partition 208, while the bottom of the main framework 204 includes an optical module positioning point 207 for the optical module 604. As the main framework 204 is unfolded, the partition positioning point 205 are connected with the partition 208, while the optical module positioning point 207 are connected to the optical module 604.

Consequently, the invention applies the concept of folding to reduce the hardware space occupied by the housing of the rear projection television, so as to reduce the cost of transportation. And also, it facilitates the user and vendors to assemble the housing and the other required components.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An assembled housing of a rear projection television, comprising:
   a foldable main framework, wherein the main framework is a flat structure as folded and a ring structure as unfolded, and wherein the ring structure comprises a front opening, a back opening, a first sidewall having a first partition positioning point, and a second sidewall having a second partition positioning point;
   a back cover located at the back opening to form a chamber; and a partition for being clasped inside the main framework to separate the chamber into an upper chamber and a lower chamber, so that the front opening is separated into an upper opening and a lower opening, and wherein the partition comprises a gateway, which connects the upper chamber and the lower chamber;

wherein when the main framework is unfolded, the partition is clasped onto the main framework via the first and second partition positioning points.

2. The assembled housing of the rear projection television as claimed in claim 1, further comprising:
a reflector located inside the upper chamber;
a screen located at the upper opening;
an optical module located inside the lower chamber; and
a lamp module located inside the lower chamber, which functions together with the optical module to produce an image on the screen;
wherein the image is reflected onto the screen through the gateway by the reflector, so that the screen can display the image.

3. The assembled housing of the rear projection television as claimed in claim 2, comprising:
a front cover, which can be clasped in the lower opening of the lower chamber.

4. The assembled housing of the rear projection television as claimed in claim 2, wherein the back cover comprises:
a foldable cover board, comprising a first hinge, wherein the foldable cover board can be folded with the first hinge; and
a mirror-framed board for placing the reflector at an end of the foldable cover board.

5. An assembled housing of a rear projection television, comprising:
a foldable main framework, wherein the main framework is a flat structure as folded and a ring structure as unfolded, wherein the ring structure has a front opening and a aback opening, and wherein the main framework comprises:
a first flat board to form a first sidewall of the ring structure;
a second flat board opposite to the first flat board to form a second sidewall of the ring structure;
a first foldable board comprising a second hinge, wherein the second hinge enables the first foldable board to fold, and two ends of the first foldable board are respectively coupled to the first flat board and the second flat board by a third hinge and a fourth hinge, so as to form a top of the ring structure; and
a second foldable board opposite to the first foldable board comprising a fifth hinge, wherein the fifth hinge enables the folding function to fold, and two ends of the second foldable board are respectively coupled to the first flat board and the second flat board by a sixth and a seventh hinge, so as to form a bottom of the ring structure; and
a back cover located at the back opening to form a chamber.

6. The rear projection television as claimed in claim 1, wherein the bottom of the main framework comprises an optical module positioning point, and the optical module positioning point can be clasped to the main framework via the optical module positioning point, while the main framework is unfolded.

7. The assembled housing of the rear projection television as claimed in claim 5, further comprising:
a partition, wherein the partition can be clasped inside the main framework to separate the chamber into an upper chamber and a lower chamber, so that the front opening is separated into an upper opening and a lower opening, and wherein the partition comprises a gateway, which connects the upper chamber and the lower chamber;
a reflector located inside the upper chamber;
a screen located at the upper opening;
an optical module located inside the lower chamber; and
a lamp module located inside the lower chamber, which functions together with the optical module to produce an image on the screen;
wherein the image is reflected onto the screen through the gateway by the reflector, so that the screen can display the image.

8. The assembled housing of the rear projection television as claimed in claim 7, comprising:
a front cover, which can be clasped in the lower opening of the lower chamber.

9. The assembled housing of the rear projection television as claimed in claim 7, wherein the back cover comprises:
a foldable cover board, comprising a first hinge, wherein the foldable cover board can be folded with the first hinge; and
a mirror-framed board for placing the reflector at an end of the foldable cover board.

10. A rear projection television, comprising:
a foldable main framework, wherein the main framework is a flat structure as folded and a ring structure as unfolded, wherein the ring structure has a front opening and a back opening, wherein the main framework comprises:
a first flat board, which forms a first sidewall of the ring structure;
a second flat board opposite to the first flat board, wherein the second flat board forms a second sidewall of the ring structure;
a first foldable board, comprising a second hinge, which enables the first foldable board to fold, wherein two ends of the first foldable board are respectively connected to the first flat board and the second flat board by a third hinge and a fourth hinge, so as to form a top of the ring structure; and
a second foldable board, comprising a fifth hinge opposite to the first foldable board, wherein the fifth hinge enables the second foldable board to fold, and two ends of the second foldable board are respectively connected to the first flat board and the second flat board by a sixth hinge and a seventh hinge, so as to form a bottom of the ring structure;
a back cover, which can be clasped at the back opening;
a partition, which can be clasped inside the main framework to form an upper chamber and a lower chamber, and to separate the front opening into an upper opening and a lower opening, wherein the partition comprises a gateway connecting the upper chamber and the lower chamber;
a lamp module located inside the lower chamber;
an optical module located inside the lower chamber;
a reflector located inside the upper chamber; and
a screen located at the upper opening;
wherein the lamp module provides a light source for the optical module to form an image, and the image is reflected onto the screen through the gateway by the reflector.

11. The rear projection television as claimed in claim 10, wherein each of the first and the second sidewalls of the main framework comprises a partition positioning point and the partition can be clasped onto the main framework via the partition positioning point, while the main framework is unfolded.

12. The rear projection television as claimed in claim 10, wherein the bottom of the main framework comprises an optical module positioning point, and the optical module positioning point can be clasped to the main framework via the optical module positioning point, while the main framework is unfolded.

13. The rear projection television as claimed in claim 10, wherein each of the top of the first sidewall and the second sidewall inclines inwards, the back cover comprises a lower backboard and a foldable cover board, and the backboard is coupled to the first sidewall and the second sidewall of the main framework.

14. The rear projection television as claimed in claim 13, wherein the reflector is located inside the foldable cover board.

15. The rear projection television as claimed in claim 10, wherein each of the top of the first sidewall and the second sidewall inclines inwards, the back cover comprises a lower backboard and a foldable cover board, and the backboard is coupled to the first sidewall and the second sidewall of the main framework.

16. The rear projection television as claimed in claim 15, wherein the reflector is located inside the foldable cover board.

17. The rear projection television as claimed in claim 10, wherein the back cover comprises:
   a foldable cover board, comprising a first hinge which enables the foldable cover to fold; and
   a mirror-framed board at an end of the foldable cover board for placing set the reflector.

18. The assembled housing of the rear projection television as claimed in claim 10, comprising:
   a front cover, which can be clasped in the lower opening of the lower chamber.

* * * * *